United States Patent
Sagnak et al.

(10) Patent No.: US 7,360,701 B2
(45) Date of Patent: Apr. 22, 2008

(54) MANAGING MAINTENANCE OF SERVICEABLE ITEMS BASED ON UNIQUE IDENTIFICATION LABELING

(75) Inventors: Cemal Sagnak, Erkelenz (DE); Bernhard Meyer, Mettmann (DE)

(73) Assignee: Ecolab Inc., St. Paul, MN (US)

( * ) Notice: Subject to any disclaimer, the term of this patent is extended or adjusted under 35 U.S.C. 154(b) by 390 days.

(21) Appl. No.: 11/089,919

(22) Filed: Mar. 24, 2005

(65) Prior Publication Data

US 2006/0217995 A1  Sep. 28, 2006

(51) Int. Cl.
*G06F 19/00* (2006.01)
(52) U.S. Cl. .............. 235/385; 235/383; 235/375; 235/462.01; 235/472.01
(58) Field of Classification Search .......... 235/375, 235/376, 383, 462.01, 472.01, 451, 492, 235/385
See application file for complete search history.

(56) References Cited

U.S. PATENT DOCUMENTS

| | | | |
|---|---|---|---|
| 6,138,056 A * | 10/2000 | Hardesty et al. ............ 700/174 |
| 6,758,403 B1 * | 7/2004 | Keys et al. ............ 235/462.45 |
| 6,998,956 B2 * | 2/2006 | Dix ............ 340/5.2 |
| 7,183,924 B1 * | 2/2007 | Ku ............ 340/572.1 |
| 2002/0091593 A1 * | 7/2002 | Fowler ............ 705/28 |
| 2004/0210360 A1 * | 10/2004 | Dietz et al. ............ 701/29 |
| 2005/0071032 A1 * | 3/2005 | Urabe ............ 700/109 |
| 2006/0006999 A1 * | 1/2006 | Walczyk et al. ............ 340/539.27 |
| 2006/0022823 A1 * | 2/2006 | Ryal ............ 340/572.1 |
| 2006/0097057 A1 * | 5/2006 | Porad ............ 235/492 |
| 2006/0244652 A1 * | 11/2006 | Tethrake et al. ............ 342/44 |
| 2006/0288072 A1 * | 12/2006 | Knapp et al. ............ 709/203 |
| 2007/0027459 A1 * | 2/2007 | Horvath et al. ............ 606/147 |
| 2007/0103313 A1 * | 5/2007 | Washington ............ 340/572.8 |
| 2007/0114280 A1 * | 5/2007 | Coop et al. ............ 235/385 |

* cited by examiner

*Primary Examiner*—Steven S. Paik
(74) *Attorney, Agent, or Firm*—Shumaker & Sieffert, P.A.

(57) ABSTRACT

A system and method for tracking and managing maintenance of serviceable items based on unique identification labeling affixed to the items is disclosed. The serviceable items are described as filters within a common environment that require routine maintenance to adhere to certain expectations relative to the operability of the items. Such operability may relate to any type of filtering of contaminants from a liquid or gaseous substance that flows through the filters. A unique identifier (ID) label is affixed to each filter. The unique ID label represents a unique filter ID that uniquely identifies the filter relative to all other filters in the common environment. A handheld computing device communicatively connected to a local computer reads the unique ID label of each filter following maintenance of the filter to track maintenance of the filters over time.

21 Claims, 6 Drawing Sheets

MANAGING MAINTENANCE OF SERVICEABLE ITEMS BASED ON UNIQUE IDENTIFICATION LABELING

TECHNICAL FIELD

The invention relates generally to tracking maintenance of serviceable items, and more particularly to administering maintenance tracking based on unique identification labeling affixed to the items.

BACKGROUND

Ever since the breakout of Legionnaires disease at the Bellevue-Statford Hotel in Philadelphia, Pa. in 1976, hotels and hospitals across the world have been equipping shower and faucet heads with filters that are intended to mitigate, if not completely prevent the spread of, this atrocious disease within these public settings. In operation, these filters effectively block legionella bacteria as well as other contaminants from being dispensed from taps from which water is typically intended for human use. Over time, as one may guess, these filters collect quite an abundance of bacteria and other deposits and therefore require routine disinfection or possibly even replacement in order to meet certain governing health codes.

Previously, maintenance of a water tap filter involved a field service person first removing the filter from the associated water tap and cleaning the filter thoroughly to remove any bacteria and other deposits collected thereon. Once cleaned, the field service person inserted the filter back into the water tap. Alternatively, single use filters were exchanged. The date on which the service was performed in either case was recorded manually. Unfortunately, such manual recordation was implemented using pen and paper, or some equivalent, and consequently, these records were oftentimes misplaced if simply not kept accurate due to faulty recordation by the field service persons. As such, many filters would go way beyond the maximum service period and, quite frankly, at that point in time were completely ineffective to block legionella bacteria and other contaminants.

SUMMARY OF THE INVENTION

In accordance with the present invention, the above and other problems are solved by a method and system for tracking maintenance of a plurality of serviceable items based on unique identification labeling affixed to the items. Exemplary serviceable items include filters that require routine maintenance to adhere to certain expectations relative to the operability of the items. Such operability may relate to any type of filtering of contaminants from a liquid or gaseous substance that flows through the filter. For example-, the filters may be water filters operable to prevent contaminants from flowing through water taps and beverage (e.g., beer, wine, soft drinks and juices) filters used to prevent contaminants from flowing through beverage taps.

In one embodiment, the present invention is directed to a method that involves reading first and second unique identifiers associated with first and second serviceable items, respectively, in response to maintenance being performed on the first and second serviceable items. The first unique identifier is stored in a data structure in association with a first time reference indicating at least a calendar date that the first unique identifier was read. Likewise, the second unique identifier is stored in a data structure in association with a second time reference indicating at least a calendar date that the second unique identifier was read. With this information, the method involves generating a report characterizing maintenance of the first serviceable item based on the first time reference and the second serviceable item based on the second time reference.

In accordance with another embodiment, a method according to the present invention involves reading a unique identifier associated with a serviceable item in response to maintenance being performed on the serviceable item and storing the unique identifier in a data structure in association with a time reference indicating at least a calendar date that the unique identifier was read. In this embodiment, the method includes determining a target time reference representing a maximum service interval for the serviceable item and analyzing the time reference stored in association with the unique identifier against the target time reference to determine whether maintenance for the serviceable item is overdue. If so, the method further includes notifying a responsible field service person that the serviceable item is overdue for maintenance by electronically initiating contact with the responsible field service person.

In yet another embodiment, the present invention is directed to a system for tracking maintenance of a plurality of serviceable items. In this embodiment, the system includes a plurality of unique identification labels affixed to each of the plurality of serviceable items. Each unique identification label represents a unique identifier (ID). The system further includes a handheld computing device that is operable to read each of the plurality of unique identification labels from the plurality of serviceable items in order to identify therefrom the represented unique ID's. In response to reading a unique filter ID, the handheld computing device associates the identified unique ID with a time reference indicating at least a calendar date that the unique ID was read. The exact location of the serviceable items is entered into the computing device at the time the identification label is read. The system also includes a local computer that is communicatively connected to the handheld computing device. The local computer receives the identified unique ID's and corresponding location from the handheld computing device and generates therefrom a report characterizing maintenance of the plurality of serviceable items based on the associated time references. The computer also generates an alarm at the next determined service date.

The invention may be implemented as a computer process, a computing system or as an article of manufacture such as a solid state, non-volatile memory device or a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

The present invention and its various embodiments are described in detail below with reference to the figures. When referring to the figures, like structures and elements shown throughout are indicated with like reference numerals. Objects and structures depicted in the figures that are covered by another object, as well as the reference annotations thereto, are shown using dashed lines.

In general, the present invention relates to tracking and managing maintenance of serviceable items based on unique identification labeling affixed to the items. In accordance with an exemplary embodiment, the serviceable items include filters that require routine maintenance to adhere to certain expectations relative to operability of the items. Such operability may relate to any type of filtering of contaminants from a liquid or gaseous substance that flow through the filters. In order to illustrate various embodiments of the present invention, these filters are described herein as water filters operable to prevent contaminants from flowing through water taps.

Figure 1:
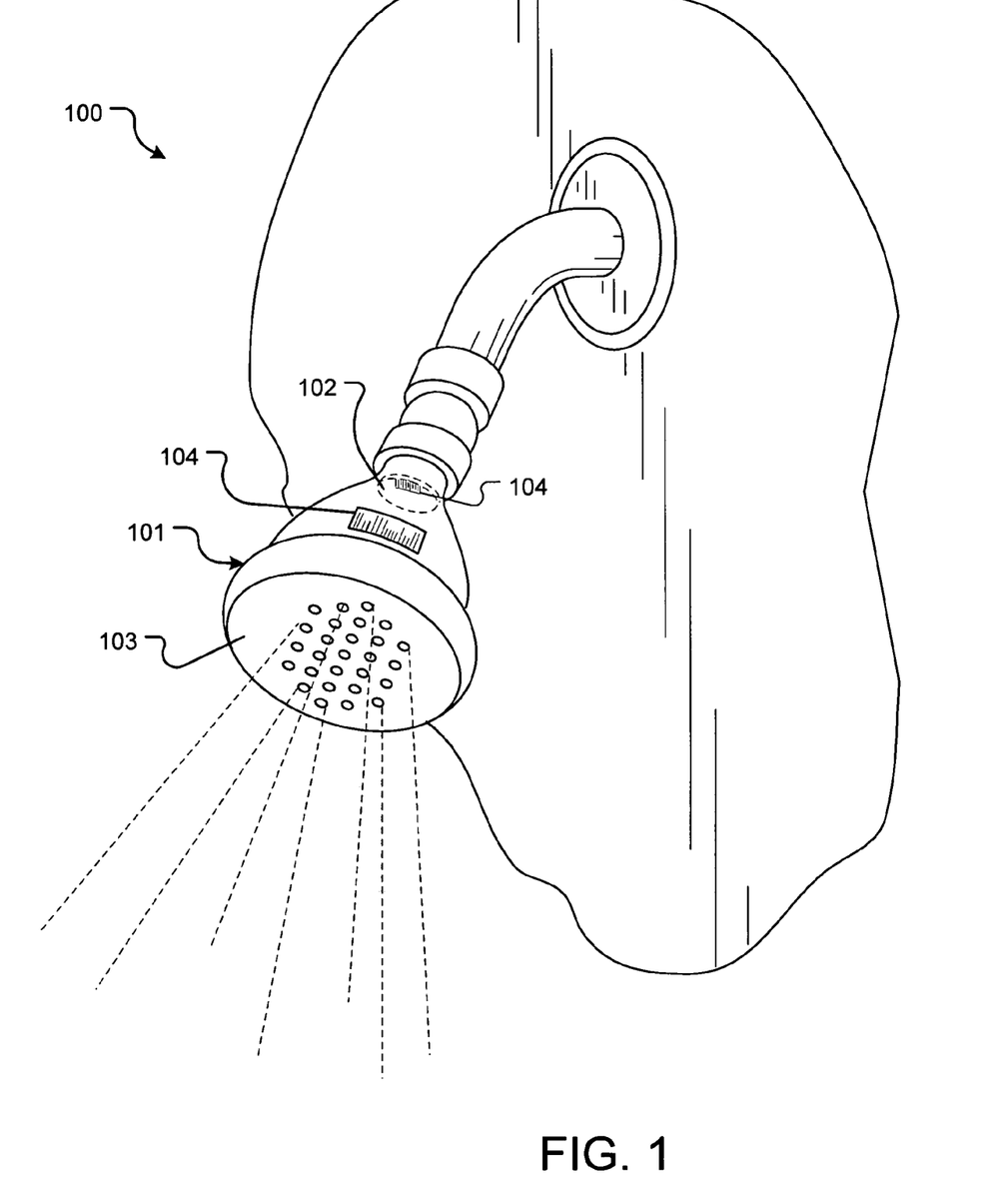
FIG. 1 depicts a filter-based environment in which the present invention is practiced in accordance with an exemplary embodiment.

With this exemplary embodiment in mind, FIG. 1 illustrates an environment 100 in which the present invention is particularly applicable to track and manage maintenance of water taps 101 in the form of a conventional showerhead. For illustration purposes, only one showerhead 101 is shown in FIG. 1, however, it should be appreciated that this environment 100 represents any setting that may include any number of showerheads 101 in accordance with various embodiments of the present invention. In this regard, exemplary settings include hotels, restaurants, hospitals, schools, prisons, dormitories or any other building or collection of buildings where it is desirable to filter water or other fluids prior to use or consumption by users.

As known to those skilled in the art, the showerhead 101 is operated by a valve (not shown) that, when opened, enables the flow of water from a water source (not shown) through a dispensing cap 103 of the showerhead 101 in an outward direction. The showerhead 101 includes a filter 102 that effectively blocks a substantial majority or all of the contaminants in the water from being dispensed through the dispensing cap 103. The dispensing cap 103 is removable (e.g., by twist off threads) in order to provide access to the inside to the showerhead 101 such that the filter 102 may be inserted and removed at leisure. Over time, the filter 102 requires routine disinfection or possibly even replacement due to the continuous collection of contaminants by the filter 102. With this in mind, an embodiment of the present invention involves recording each performed maintenance of the filter 102 during which the filter 102 is disinfected, replaced or otherwise serviced.

To accomplish such recordation, a unique identifier (ID) label 104 is affixed to the filter 102. The unique ID label 104 represents a unique filter ID that uniquely identifies the filter 102 relative to a plurality of other serviceable filters within the environment 100. In accordance with another embodiment, a unique ID label 104 is also affixed to the showerhead 101, in which case the label 104 affixed to the filter 102 uniquely identifies the filter 102 within the environment 100 whereas the label 104 affixed to the showerhead 101 uniquely identifies the showerhead 101 (also referred to as "host," and thus this unique identification is referred to herein as "unique host ID") relative to a plurality of other showerheads within the environment 100. In yet another embodiment, only the showerhead 101 includes the unique ID label 104, and in this case the unique ID label 104 may represent either the unique host ID or the unique filter ID. For illustration purposes, the unique ID label 104 is hereinafter described as being affixed to and uniquely identifying the filter 102, and thus represents a "unique filter ID." The unique ID label 104 may take any form, but in accordance with an exemplary embodiment, is described as a waterproof bar code label.

Figure 2:
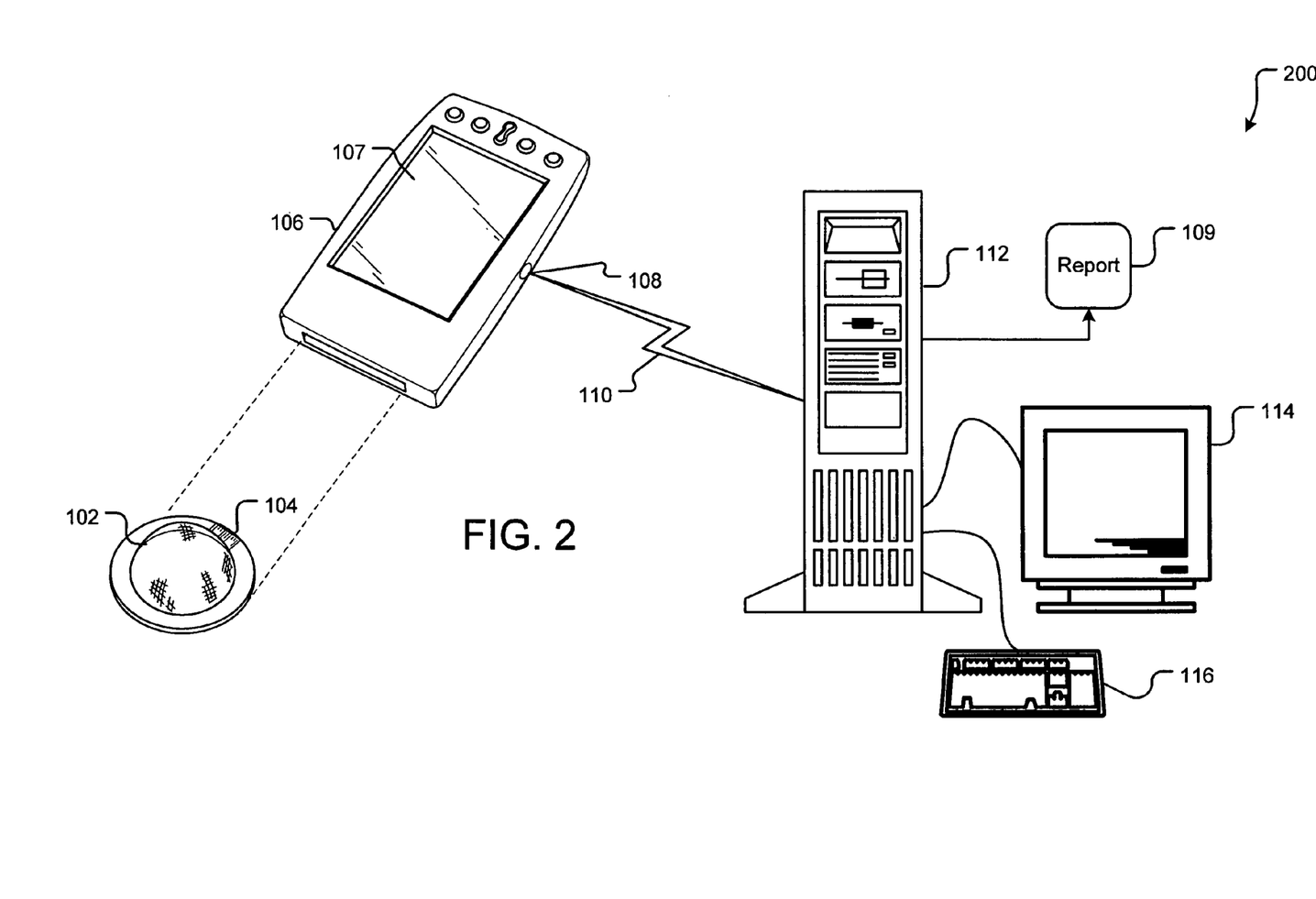
FIG. 2 is a system for tracking maintenance of filters in the environment of FIG. 1 in accordance with an embodiment of the present invention.

Turning now to FIG. 2, a system 200 for tracking maintenance of filters 102 in the environment 100 of FIG. 1 is shown in accordance with an embodiment of the present invention. Again, while only a single filter 102 is shown for illustration purposes, it should be appreciated that the tracking system 200 is preferably operable to track maintenance of any number of filters 102 for use in recordation and analysis as described in more detail below.

The tracking system 200 includes an ID reader 106 and a local computer 112, which are communicatively connected together by a data communication link 110. A monitor 114 and a user interface device, such as, for example, a keyboard 116, collectively provide users with the ability to interact with the local computer 112. The ID reader 106 is shown for exemplary purposes as a bar code reader in the form of a handheld computing system, e.g., a personal digital assistant (PDA), having a display device 107. It should be appreciated that the ID reader 106 may take any form known to those skilled in the art for reading or scanning information from a label or other identifying means (e.g., Radio Frequency Identification tag, microchip, etc.) and archiving that information to memory. For example, the ID reader 106 is shown in FIG. 2 as operable to read the unique filter ID represented as a bar code on the ID label 104 of the filter 102 and store this unique filter ID in combination with a time reference corresponding to a calendar date and/or time that the unique filter ID was read. As described below in connection with FIG. 5, the ID reader 106 is also operable to store the detected unique filter ID and the time reference in association with information (e.g., host ID) identifying the showerhead 101 as being a specific showerhead 101 of a plurality of showerheads within the environment 100.

In an embodiment, this information is stored in memory of the ID reader 106 in the form of a data structure, an exemplary representation of which is shown below in Table 1. The data structure represents a data file to which information used to track service of filters 102 is written in response to detection of each unique filter ID. In an embodiment, the data structure is re-writeable, i.e., as the unique filter ID for a particular filter 102 is read, an entry record is either created in the data structure for that unique filter ID or, if an entry record already exists, then the previously-stored time reference and the host ID (if any) are written over with currently-determined time reference and host ID (if any).

TABLE 1

| Entry Records | Unique ID (Filter) | Unique ID (Host) | Date | Time |
|---|---|---|---|---|
| 1 | 50150E6730 | A-1 | Jan. 18, 2005 | 07:30:45 |
| 2 | 50151E1342 | A-2 | Jan. 18, 2005 | 07:31:20 |
| 3 | 50151B2509 | A-3 | Jan. 18, 2005 | 07:31:40 |
| 4 | 50151D2D24 | A-4 | Jan. 18, 2005 | 07:32:10 |
| 5 | 50151A2452 | B-1 | Jan. 18, 2005 | 07:32:30 |

With reference to Table 1, above, this exemplary data structure is in tabular form and includes a plurality of entry records (e.g., rows), each entry record having a unique filter ID read from a unique ID label 104 on a filter 102 (or alternatively, showerhead 101) in the environment 100 as well as a time reference documenting the calendar date and/or time that each unique filter ID was read. In an embodiment, each entry record also includes a "host ID" representing the showerhead 101 from which each unique filter ID was read. Such a host ID may represent, for example, a room number of a hotel room in which the showerhead 101 is maintained. In accordance with an embodiment of the present invention, the host ID is read by the ID scanner 106 from an ID label 104 affixed to the showerhead 101. Alternatively, the host ID may be manually entered into the ID reader 106 by the field service person maintaining the associated filter 102.

In addition to data retrieval and archiving functionality, the ID reader 106 is also operable to upload any information stored in its memory to the local computer 112 by way of the communication link 110. In accordance with various embodiments, the communication link 110 may be any known wire-based or wireless medium, but for exemplary purposes is shown as a wireless medium. As such, the ID reader 106 includes a wireless interface port 108 through which information is transmitted to the local computer 112.

The local computer 112 stores any information received from the ID reader 106 to memory for future analysis or reporting, as described in more detail in connection with FIGS. 3-6. As such, an embodiment of the present invention involves the local computer 112 receiving the information collected by the ID reader 106 in the form of a data structure, which is then archived by the local computer 112 to memory. Alternatively, however, the local computer 112 may receive collected information from the ID reader 106 either in native or data structure format and, in turn, create or populate a pre-existing data structure with the collected information. Regardless of the implementation, the information includes one or more detected unique filter ID's in association with at least a time reference indicative of a calendar date and/or time during which each unique filter ID is detected and, in an embodiment, also includes a host ID representing the specific showerhead 101 associated with each detected unique filter ID.

In operation, the ID reader 106 is used by a field service person to scan the ID label 104 to read the associated unique filter ID after the filter 102 has been serviced in some fashion. The term "serviced" is used broadly throughout this description to refer to any type of maintenance that may possibly be performed with respect to the filter 102 including, without limitation, cleaning, sanitizing, disinfecting and exchange of the filter 102 for a new filter, in which case the ID label 104 affixed to the new filter is read by the ID reader 106.

The calendar date and/or time (referred to herein as "time reference") at which the unique filter ID is read from the scanned ID label 104 is stored in memory of the ID reader 106 in association with the unique filter ID, as shown above in the exemplary data structure of Table 1. In accordance with an embodiment, the field service person then either scans the ID label 104 affixed to the associated showerhead 101 to retrieve information (e.g., host ID) uniquely identifying that showerhead 101 or manually inputs this information into the ID reader 106. After the unique filter ID is stored in association with a time reference in the ID reader 106, the field service person may take one of several actions regardless of whether the host ID is collected along with the unique filter ID and time reference. These actions are as follows: (1) continue to another showerhead 101 and repeat maintenance and recordation processes; (2) upload the collected information to the local computer 112 alone or in combination with previously detected unique filter ID's from other filters 102 in the environment 100 for storage and/or future maintenance tracking analysis; (3) request that the ID reader 106 perform maintenance tracking analysis; or (4) power down the ID reader 106 altogether.

If the field service person continues to another showerhead 101 for maintenance, the ID reader 106 is used in similar fashion to read the associated unique filter ID and store this ID in association with a corresponding time reference. Ultimately, the field service person will power down, upload the information to the local computer 112 or request some form of maintenance tracking analysis by the ID reader 106. Powering down simply turns off the ID reader 106 such that no further unique filter ID's may be read until the device is powered on again. Thus, ultimately, the field service person will either (1) upload the information to the local computer 112 for storage and/or future maintenance tracking analysis; or (2) request maintenance tracking analysis by the ID reader 106. Exemplary forms of maintenance tracking include analyzing the detected unique filter ID's and associated time references to render a report 109 that illustrates maintenance characteristics for the filters 102 as well as which filters 102 may be overdue for maintenance. If the analysis is performed on the ID Reader 106, the report 109 is preferably output to the display screen 107, whereas if this analysis is performed on the local computer 112, the report 109 is either output on the monitor 114 or as a hard copy report, as shown in exemplary fashion in FIG. 2.

As described in greater detail in connection with FIG. 6, the local computer 112 may also serve as an automatic notification system for notifying field service persons that the maintenance for a particular filter 102 is overdue. To accomplish this, the local computer 112 routinely analyzes the time references stored in association with each recorded unique filter ID in order to identify if the most recent, previous time reference for any particular filter 102 occurred prior to a determined target time reference. The local computer 112 then issues a notification to one or more responsible field service persons identifying the filter(s) 102 (if any) for which maintenance is overdue. Such automatic notification may be administered any number of ways. One such example involves the local computer 112 electronically notifying a responsible field service person by email, fax, pager, phone or by sending an alarm message to the ID reader 106 for display on the display screen 107. Such notification may additionally or alternatively be displayed to the user of the local computer 112 through the monitor 114 in response to start-up of the local computer 112. Even further, such notification may be administered by the local computer 112 automatically printing out the report 109 rather than waiting for a request by the field service person.

Figure 3:
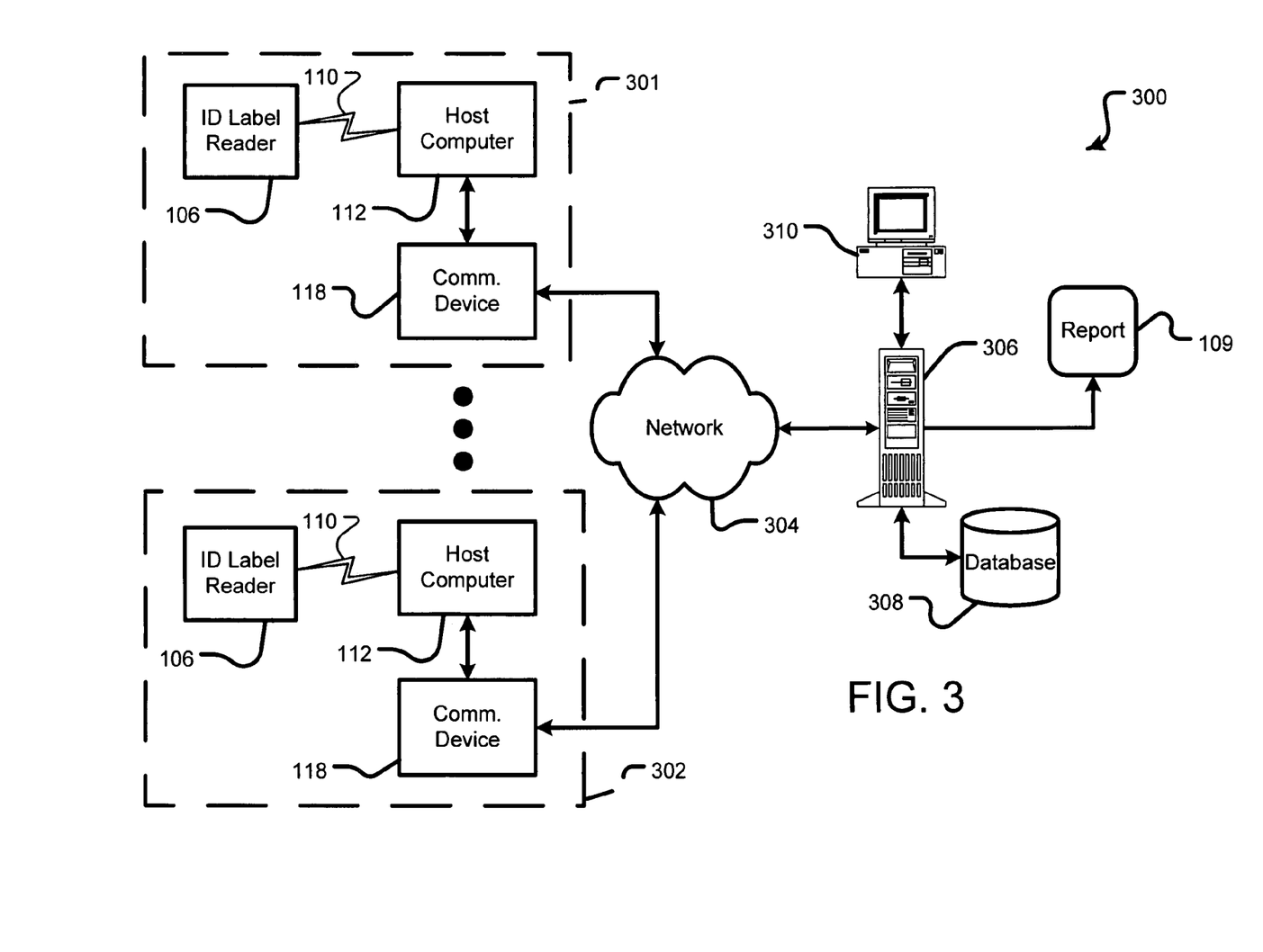
FIG. 3 illustrates an exemplary communications network wherein the tracking system of FIG. 2 is connected to a server computer in accordance with an embodiment of the present invention.

With reference now to FIG. 3, a distributed system 300 for tracking maintenance of filters 102 at a plurality of environments 301 and 302 is shown in accordance with an embodiment of the present invention. While only two environments 301 and 302 are shown in order to clearly and concisely illustrate the distributed system 300, any number of environments are contemplated within the scope of the present invention. For illustrative purposes, the environments 301 and 302 are described herein to each embody substantially the same environment 100 described in connection with FIGS. 1 and 2. As such, each environment 301 and 302 includes a plurality of serviceable filters 102, each having an ID label 104, and a tracking system (e.g., 200), which includes as described above, an ID reader 106 and a local computer 112, both of which function as described above. In addition, the distributed system 300 includes a plurality of local communication devices 118, one for each environment 301 and 302, a server computer 306, a database 308, a client computer 310 and a communications network 304.

The communication devices 118 are co-located at the environments 301 and 302 with the host computers 112 and are operable to transmit information stored on the host computers 112 to the server computer 306 via the communications network 304. This information is then stored by the server computer 306 to the database 308. In operation, the server computer 306 accesses the database 308 to retrieve data embodying unique filter ID's and corresponding time references detected at one or more of the environments 301 and/or 302 for analysis. Based on this analysis, the server computer 306 issues a report 109 that characterizes maintenance of the evaluated filters 102, including, as noted above, notification that maintenance of a particular filter 102 is overdue.

In addition to the maintenance characteristics and overdue notifications described above in connection with FIG. 2, the report 109 may also include comparisons between maintenance practices at the different environments 301 and 302. To accomplish this, the server computer 306 takes into account the specific environment (e.g., 301 and 302) from which the unique ID's are received while analyzing the received data. Thus, in this network embodiment, the report 109 may illustrate not only maintenance characteristics on a per-filter basis, but also on a per-environment basis. For example, the report 109 may show that showerheads 101 in the first environment 301 as a whole are serviced twice as much as the showerheads 101 in the second environment 302, thereby indicating a higher degree of contamination at the first environment 301.

A client computer 310, e.g., a thick or thin client, may be communicatively connected to the server computer 306 for providing remote access to the server computer 306. Thus, the client computer 310 is operable to remotely request generation of the report 109. In this regard, the maintenance tracking analysis described above may be implemented on either the server computer 306 in response to request by the client computer 310, or alternatively, by the client computer 310 in receipt of unique filter ID's and time references transmitted thereto by the server computer 306.

The communications device 118 can also receive information via the communications network 304 to provide a feedback loop to the local computer 112 and the ID reader 102. For example, such information may embody the report 109 or automatic notification that maintenance on a filter 102 is overdue. This capability facilitates the management of multiple, geographically dispersed environments (e.g., 301 and 302).

Figure 4:
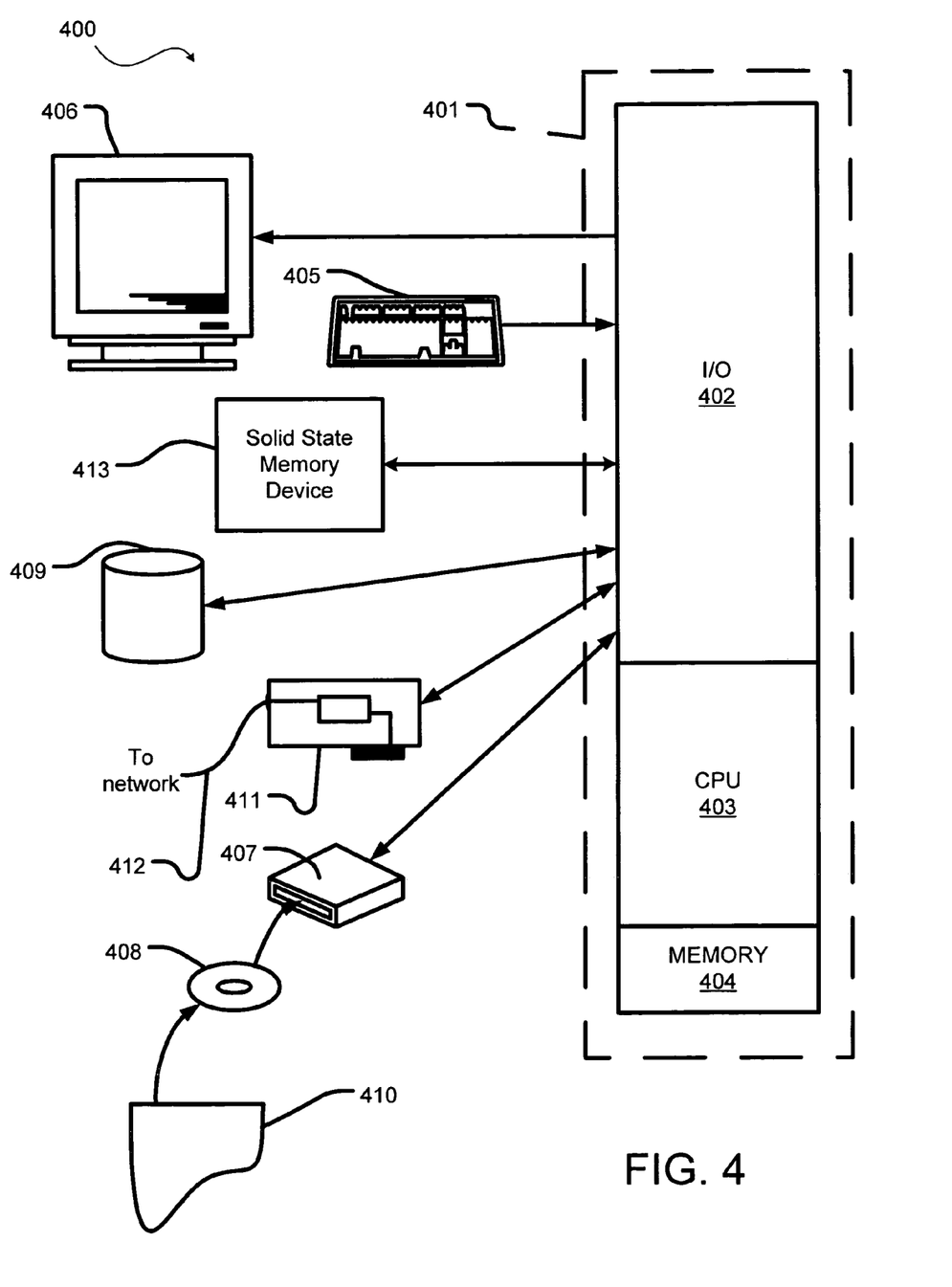
FIG. 4 depicts a general-purpose computer that implements logical operations of an embodiment of the present invention.

FIG. 4 depicts a computing system 400 capable of executing a program product embodiment of the present invention. One operating environment in which the present invention is potentially useful encompasses the computing system 400, such as, for example, the ID reader 102, the local computer 112 or a remote computer (e.g., server computer 306) to which information maintained on the local computer 112 may be uploaded. In such a system, data and program files may be input to the computing system 400, which reads the files and executes the programs therein. Some of the elements of a computing system 400 are shown in FIG. 4 wherein a controller, illustrated as a processor 401, is shown having an input/output (I/O) section 402, a microprocessor, or Central Processing Unit (CPU) 403, and a memory section 404. The present invention is optionally implemented in software or firmware modules loaded in memory 404 and/or stored on a solid state, non-volatile memory device 413, a configured CD-ROM 408 or a disk storage unit 409. As such, the computing system 400 is used as a "special-purpose" machine for implementing the present invention.

The I/O section 402 is connected to a user input module 405, a display unit 406 (e.g., monitor 114) and one or more program storage devices, such as, without limitation, the solid state, non-volatile memory device 413, the disk storage unit 409, and the disk drive unit 407. In FIG. 4, the user input module 405 is shown as a keyboard (e.g., keyboard 116) for illustration purposes, but as noted above, may also be any other type of apparatus (e.g., mouse, joystick, track ball, etc.) for inputting commands into the processor 401. The solid state, non-volatile memory device 413 is an embedded memory device for storing instructions and commands in a form readable by the CPU 403. In accordance with various embodiments, the solid state, non-volatile memory device 413 may be Read-Only Memory (ROM), an Erasable Programmable ROM (EPROM), Electrically-Erasable Programmable ROM (EEPROM), a Flash Memory or a Programmable ROM, or any other form of solid state, non-volatile memory. In accordance with one embodiment, the disk drive unit 407 is a CD-ROM driver unit capable of reading the CD-ROM medium 408, which typically contains programs 410 and data. Computer program products containing mechanisms to effectuate the systems and methods in accordance with the present invention may reside in the memory section 404, the solid state, non-volatile memory device 413, the disk storage unit 409 or the CD-ROM medium 408.

In accordance with an alternative embodiment, the disk drive unit 407 may be replaced or supplemented by a floppy drive unit, a tape drive unit, or other storage medium drive unit. A network adapter 411 is capable of connecting the computing system 400 to a network of remote computers via a network link 412. Examples of such systems include SPARC systems offered by Sun Microsystems, Inc., personal computers offered by IBM Corporation and by other manufacturers of IBM-compatible personal computers, and other systems running a UNIX-based or other operating system. A remote computer may be a desktop computer, a server, a router, a network PC (personal computer), a peer device or other common network node, and typically includes many or all of the elements described above relative to the computing system 400. Logical connections may include a local area network (LAN) or a wide area network (WAN). Such networking environments are commonplace in offices, enterprise-wide computer networks, intranets, and the Internet.

In accordance with a program product embodiment of the present invention, software instructions stored on the solid state, non-volatile memory device 413, the disk storage unit 409, or the CD-ROM 408 are executed by the CPU 403. In this embodiment, these instructions may be directed toward any one or more of the following tasks: reading ID labels 104 to detect unique filter ID's represented thereon, determining time references during which unique filter ID's are detected, analyzing time references to determine whether maintenance on a filter 102 is overdue, analyzing the detected unique filter ID's, time references and/or collected host ID's to generate a report 109. Data is stored in the memory section 404, or on the solid state, non-volatile memory device 413, the disk storage unit 409, the disk drive unit 407 or other storage medium units coupled to the system 400.

In accordance with one embodiment, the computing system 400 further comprises an operating system and usually one or more application programs. Such an embodiment is familiar to those of ordinary skill in the art. The operating system comprises a set of programs that control operations of the computing system 400 and allocation of resources. The set of programs, inclusive of certain utility programs, also provide a graphical user interface to the user. An application program is software that runs on top of the operating system software and uses computer resources made available through the operating system to perform application specific tasks desired by the user. In accordance with an embodiment, the operating system employs a graphical user interface, wherein the display output of an application program is presented through the graphical user interface on the display 406. The operating system is operable to multitask, i.e., execute computing tasks in multiple threads, and thus may be any of the following: Microsoft Corporation's "WINDOWS 95," "WINDOWS CE," "WINDOWS 98," "WINDOWS 4000" or "WINDOWS NT" operating systems, IBM's OS/2 WARP, Apple's MACINTOSH OSX operating system, Linux, UNIX, etc.

In accordance with the practices of persons skilled in the art of computer programming, the present invention is described below with reference to acts and symbolic representations of operations that are performed by the computing system 400, i.e., the ID reader 102, the local computer 112 or a remote computer (e.g., server computer 306) communicatively coupled thereto, unless indicated otherwise. Such acts and operations are sometimes referred to as being computer-executed. It will be appreciated that the acts and symbolically represented operations include the manipulations by the CPU 403 of electrical signals representing data bits causing a transformation or reduction of the electrical signal representation, and the maintenance of data bits at memory locations in the memory 404, the solid state, non-volatile memory device 413, the configured CD-ROM 408 or the storage unit 409 to thereby reconfigure or otherwise alter the operation of the computing system 400, as well as other processing signals. The memory locations where data bits are maintained are physical locations that have particular electrical, magnetic, or optical properties corresponding to the data bits.

The logical operations of the various embodiments of the present invention are implemented either manually and/or (1) as a sequence of computer-implemented steps running on a computing system, e.g., the ID reader 102, the local computer 112 or the server computer 306, and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, acts, steps or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 5:
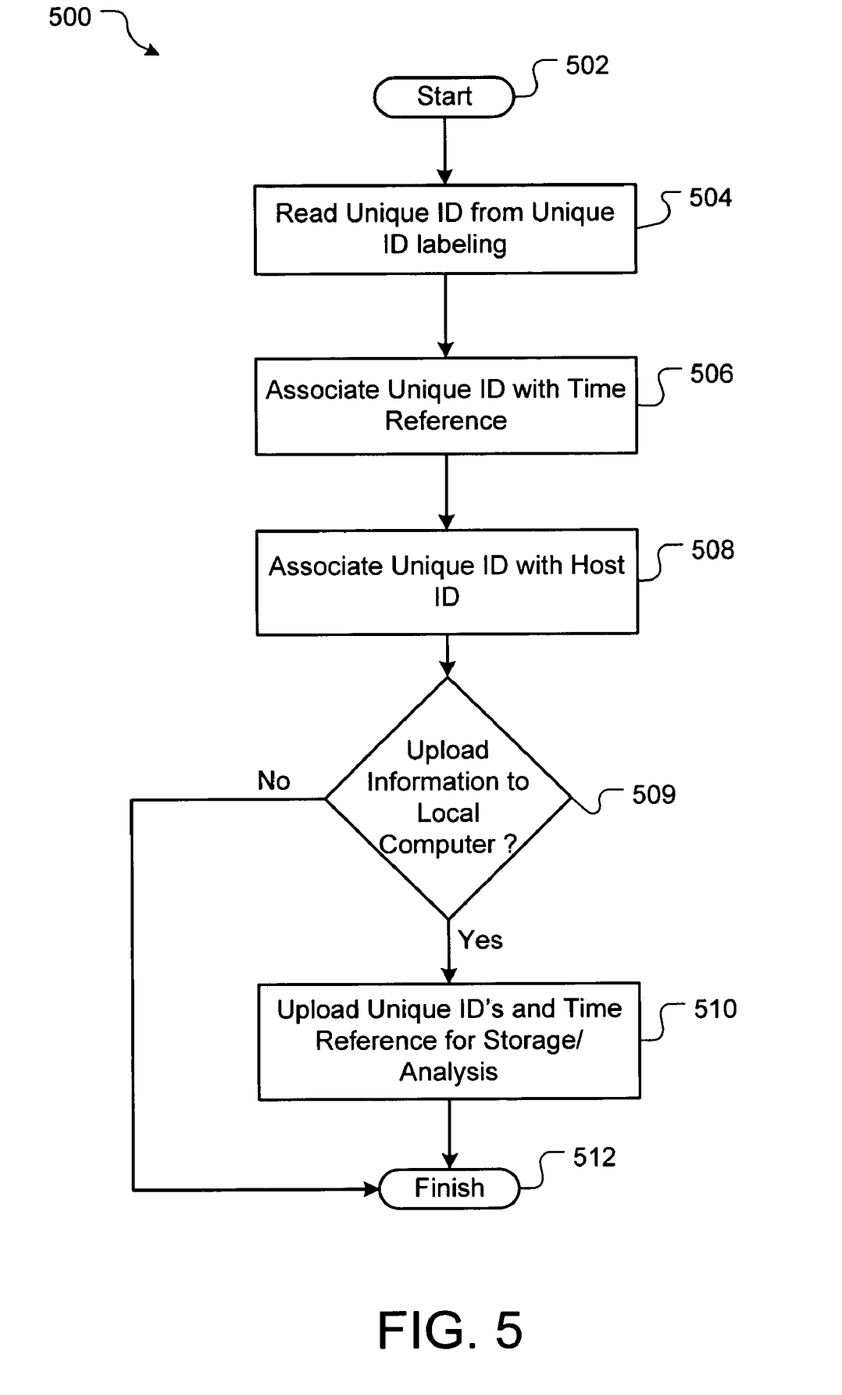
FIG. 5 is a flow diagram that illustrates operational characteristics for tracking maintenance of filters in the environment of FIG. 1 in accordance with an embodiment of the present invention.

With the computing environment in mind, FIG. 5 illustrates operational characteristics of a process 500 for tracking maintenance of filters 102 in the environment of FIG. 1 in accordance with an embodiment of the present invention. As such, each filter 102 being tracked is associated with a unique ID embodied on a unique ID label 104 affixed to the filters 102. The tracking process 500 shown in FIG. 5 is described as being practiced using components embodied in the local tracking system 200 in accordance with an exemplary embodiment of the present invention. In this regard, the local tracking system 200 described in FIG. 2 is operable to practice the tracking process 500, and thus, the logical operations of the tracking process 500 are described herein as being performed by the ID Reader 106 for illustrative purposes.

In an embodiment, the tracking process 500 is performed using an operation flow beginning with a start operation 502 and ending with a terminate operation 512. The start operation 502 is initiated in response to a field service person activating the ID reader 106 to record the maintenance of a filter 102. From the start operation 502, the operation flow passes to a scan operation 504. In the scan operation 504, the field service person is scanning the ID label 104 on the filter 102 using the ID reader 106, and as a result, the ID reader 106 reads the unique ID for the serviced filter 102 and thereafter stores the unique filter ID to local memory on the ID reader 106. After the detected unique filter ID is stored to local memory, the operation flow then passes to a first associate operation 506.

The first associate operation 506 associates the detected unique filter ID with a time reference indicative of a calendar date and/or time that the ID label 104 was read by the scan operation 504. In an embodiment, this association is made by storing the detected unique filter ID as an entry record (e.g., row) in a data structure in the local memory in combination with the associated time reference. From the first associate operation 506, an embodiment of the present invention involves the operation flow passing to a second associate operation 508. The second associate operation 508 is optional, and as such, the operation flow may by-pass the second associate operation 508 and proceed directly to a query operation 509, which is described in more detail below.

If practiced, the second associate operation 508 associates the detected unique filter ID with a host ID corresponding to the showerhead 101 in which the filter 102 is used. Like the first associate operation 506, such an association may be made by storing the host ID in combination with the detected unique filter ID and the time reference in the appropriate entry record (e.g., row) of the data structure, as shown in Table 1, above. Also, in accordance with alternative embodiments of the present invention, the host ID may be entered into this data structure either by scanning the ID label 104 affixed to the associated showerhead 101 to retrieve the host ID represented thereon or by the field service person manually inputting this information into the ID reader 106. From the second associate operation 508, the operation flow passes to a query operation 509.

The query operation 509 determines whether the field service person has requested to upload the data structure having the entries corresponding to the detected unique filter ID's to the local computer 112, and if so, passes the operation flow to an upload operation 510. Otherwise, the operation flow concludes at the terminate operation 512 and the data structure is maintained on the ID reader 106 for future scanning, analysis and/or upload, as described above.

The upload operation 510 uploads the detected unique filter ID, associated time reference and host ID (if any) to the local computer 112 for storage. In an embodiment, the upload operation 510 is administered after the field service person has serviced a plurality of filters 102. In this embodiment, the data structure, which may include any number of associated unique filter ID's, time references and host ID's (if any), embodies the information uploaded by the upload operation 510 to the local computer 112. Once stored on the local computer 112, the data structure may be analyzed to characterize maintenance of the various filters 102 from which the detected unique filter ID's were read. From the upload operation 510, the operation flow concludes at the terminate operation 512.

As noted above, the local computer 112 may be connected by a communications network 304 to a server computer 306 within a distributed computing system 300. As such, another upload operation (not shown) may be administered wherein the data structure having entry records for all detected unique filter ID's and associated time references is uploaded to the server computer 306 for storage in the database 308. In this embodiment, the server computer 306 is therefore operable to analyze the data structure to characterize maintenance of the various filters 102 being tracked within multiple environments.

Figure 6:
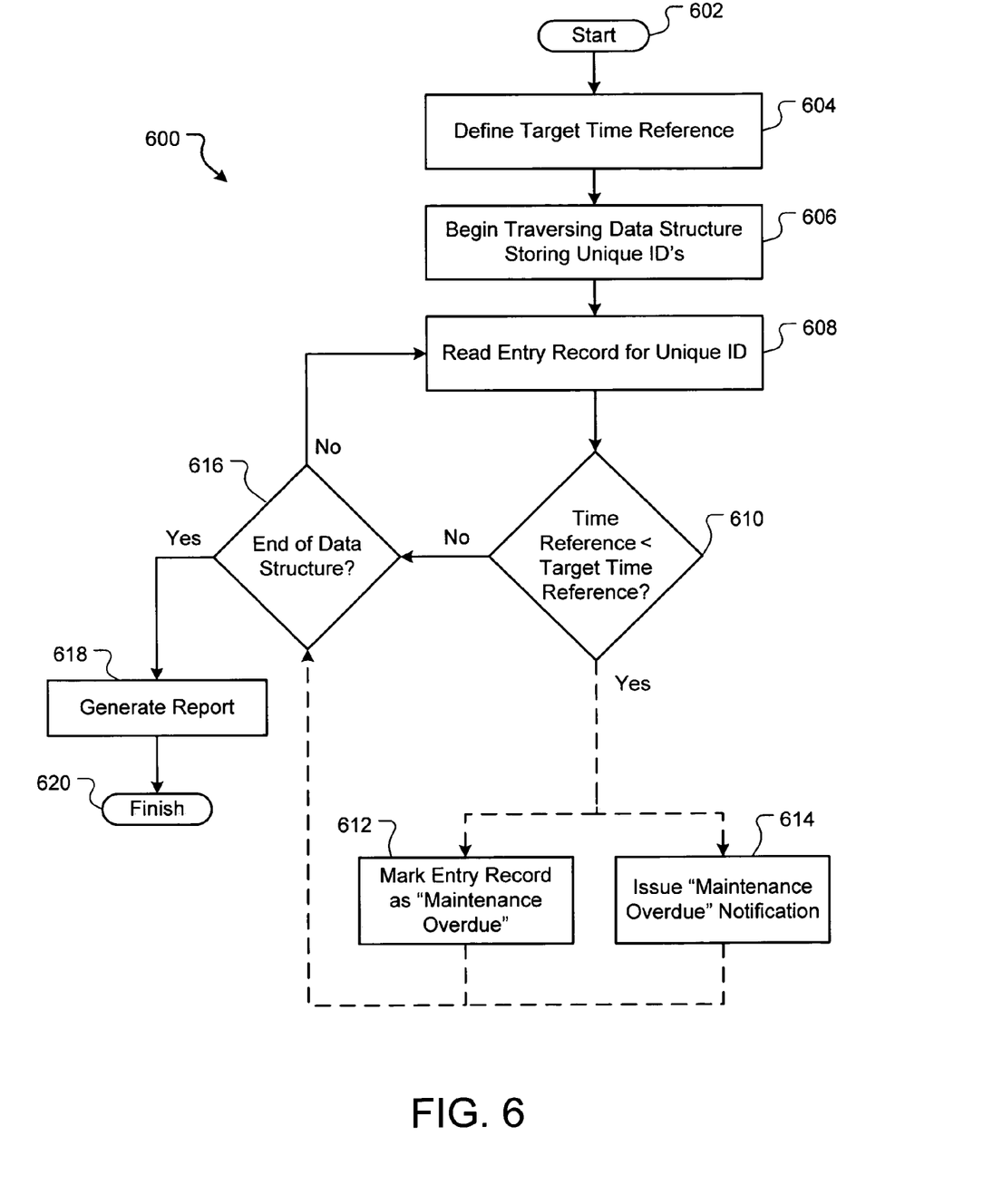
FIG. 6 is a flow diagram that illustrates operational characteristics for managing filter maintenance in the environment of FIG. 1 in accordance with an embodiment of the present invention.

Turning now to FIG. 6, a process 600 for managing maintenance of filters in the environment of FIG. 1 is shown in accordance with an embodiment of the present invention. In particular, the management process 600 includes operational characteristics for analyzing the data structure compiled by the tracking process 500 to determine whether maintenance for a particular filter 102 is overdue. As such, the management process 600 may be practiced on the ID reader 106, the local computer 112 or the server computer 306, and optionally on the client computer 310, in accordance with various embodiments of the present invention.

The management process 600 is performed using an operation flow beginning with a start operation 602 and concluding with a terminate operation 620. The start operation 602 is initiated in response to a request to analyze the maintenance characteristics relative to filters 102 within at least one environment (e.g., 301 and 302). Such a request may either be entered by a user (e.g., requesting generation of the report 109) or periodically initiated (in automatic fashion) by either the ID reader 106, the local computer 112 or the server computer 306.

From the start operation 602, the operation flow passes to a define target operation 604. The define target operation 604 defines a target time reference that, relative to the current calendar date and/or time, represents the maximum desired interval that a filter 102 may go without being serviced. As such, this maximum desired interval is commonly referred to as a "service interval." The target time reference is preferably in calendar date and/or time format for later comparison and analysis against time references in the data structure. From the define target operation 604, the operation flow passes to a traverse operation 606.

The traverse operation 606 begins traversing the entry records in the data structure (e.g., Table 1) and the operation flow passes immediately to the read entry operation 608. The read entry operation 608 reads each entry record encountered while traversing the data structure to determine the time reference currently stored for each unique filter ID in the data structure, and in response to reading an entry record, passes the operation flow to a first query operation 610. The first query operation 610 analyzes the entry record to determine whether the time reference contained in the record specifies a point in time prior to the target time reference. If so, the operation flow may pass to either one of two alternative operations (hence, the "yes" branch from the first query operation 610 is shown in dashed lines): a mark entry operation 612 or an issue notification operation 614. Otherwise, the operation flow passes to a second query operation 616, which is described in more detail below.

The mark entry operation 612 marks the entry record with a special notation that maintenance is overdue for the filter 102 associated with the unique filter ID specified in the read entry record. Therefore, any reports 109 generated based on the data structure reflect this overdue notice. In contrast, the issue notification operation 614 automatically issues a notification to a responsible field service person that such maintenance is overdue. Such notification may be implemented by any conventional means, such as the electronic notification illustrations described above in connection with FIG. 2. From both the mark entry operation 612 and the issue notification operation 614, the operation flow passes to the second query operation 616.

The second query operation 616 determines whether all entry records in the data structure have been evaluated against the target time reference by the first query operation 610. If so, the operation flow passes to a generate report operation 618. Otherwise, the operation flow passes back to the read entry operation 608 and continues as described above.

The generate report operation 618 generates the report 109 that characterizes maintenance of each filter 102 for which the read operation 608 read the unique filter ID while traversing the data structure. If the management process 600 is performed by the ID reader 106, the report 109 is preferably presented to a user through the display screen 107. If the management process 600 is performed by the local computer 112, the report 109 may be presented to a user either through the display screen 107 on the ID reader 106, the monitor 114 or as a hard copy output from a printer. If the management process 600 is performed by the server computer 306, the report 109 may be presented to a user by email or fax, through a display screen on the client computer 310, through the display screen 107 on the ID reader 106, the monitor 114 of the local computer 112 or as a hard copy output from a printer. From the generate report operation 618, the operation flow concludes at a terminate operation 620.

It will be clear that the present invention is well adapted to attain the ends and advantages mentioned, as well as those inherent therein. While a presently preferred embodiment has been described for purposes of this disclosure, various changes and modifications may be made which are well within the scope of the present invention. For example, while the unique ID labels 104 are described in an embodiment as being bar code labels, alterative forms of labeling are contemplated within the scope of the present invention.

For example, Radio Frequency Identification (RFID) tags may be used as the unique ID labels instead of the bar code labels.

Furthermore, while an exemplary embodiment of the present invention is directed to managing maintenance schedules for water filters, it should also be appreciated that the present invention applies to any and all forms of filters through which a liquid or gas may pass. One such embodiment involves managing a maintenance schedule for use in maintaining beverage tap filters based on unique identification labels affixed separately to each of the beverage tap filters. Exemplary beverages include beer, juice, wine and soft drinks. Even further, the present invention is applicable to track and manage maintenance of any other type of serviceable item.

In addition, the scan operation 504 is described above with the local memory to which detected unique filter ID's are stored being resident on the ID reader 106. Alternatively, this local memory may reside on the local computer 112, in which case the scan operation 504 involves communicating the detected unique filter ID to the local computer 112 via the data communication link 110. In this alternative embodiment, the first and second associate operations 506 and 508 are preferably practiced by the local computer 112 rather than the ID reader 106, as described above. Furthermore, in this alternative embodiment, the query operation 509 and the upload operation 510 are either bypassed altogether (because the information is already maintained on the local computer 112) or instead function to upload the detected unique filter ID's, associated time references and host ID's (if any) to the server computer 306 for storage and analysis.

Numerous other changes may be made which will readily suggest themselves to those skilled in the art and which are encompassed in the spirit of the invention disclosed and as defined in the appended claims.

What is claimed is:

1. A method comprising:
reading a first unique identifier associated with a serviceable item in response to maintenance being performed on the serviceable item;
reading a second unique identifier associated with a host associated with the serviceable item;
storing the first unique identifier in a data structure in association with a time reference indicating at least a calendar date that the first unique identifier was read;
storing the second unique identifier in the data structure in association with the first unique identifier and the time reference; and
generating a report characterizing maintenance of the serviceable item based on the time reference.

2. The method of claim 1, further comprising:
uploading the data structure to a local computing system, wherein generating a report comprises generating a report characterizing maintenance of the serviceable item at the local computing system.

3. The method of claim 1, wherein reading a first unique identifier comprises reading a first unique identifier associated with a filter that filters contaminants from a substance.

4. The method of as claim 3, wherein reading a first unique identifier comprises reading a first unique identifier associated with a filter that filters contaminants from a fluid.

5. The method of claim 3, wherein reading a first unique identifier comprises reading a first unique identifier associated with a filter that filters contaminants from a gas.

6. The method of claim 1, further comprising:
determining a target time reference representing a maximum service interval for the serviceable item; and
analyzing the time reference stored in association with the first unique identifier against the target time reference to determine whether maintenance for the serviceable item is overdue.

7. The method of claim 6, wherein generating a report further includes
adding a notation on the report that the first serviceable item is overdue for maintenance.

8. The method of claim 6, further comprising:
notifying a field service person when the serviceable item is overdue for maintenance.

9. The method of claim 8 further comprising electronically initiating contact with the field service person when the serviceable item is overdue for maintenance.

10. The method of as defined in claim 1, further comprising:
uploading the data structure to a remote computer for storage and analysis.

11. The method of claim 10, wherein generating a report comprises generating a report characterizing maintenance of the serviceable item at the remote computer.

12. The method of claim 1, further comprising:
uploading the data structure to a remote computer;
at the remote computer, determining a target time reference representing a maximum service interval for the serviceable item;
at the remote computer, analyzing the time reference stored in association with the first and the second unique identifiers against the target time reference to determine whether maintenance for the serviceable item is overdue; and
automatically generating an electronic notification to a field service person based on the analysis.

13. A method comprising:
reading a first unique identifier associated with a serviceable item;
storing the first unique identifier in a data structure in association with a time reference indicating at least a calendar date that the first unique identifier was read;
reading a second unique identifier associated with a host associated with the serviceable item;
storing the second unique identifier in the data structure in association with the first unique identifier and the time reference;
determining a target time reference representing a maximum service interval for the serviceable item; and
analyzing the time reference stored in association with the unique identifier against the target time reference to determine whether maintenance For the serviceable item is overdue.

14. The method of claim 13, further comprising:
automatically generating an electronic notification to a field service person when the serviceable item is overdue for maintenance.

15. The method of claim 13, wherein reading and storing the unique identifier farther comprise:
reading the first unique identifier associated with a serviceable item using a handheld computing system;
storing the first unique identifier in a data structure within the handheld computing system, and wherein the method further comprises
uploading the data structure from the handheld computing system to a local computing system.

16. The method of claim 15, further comprising
displaying a message on the local computer system that the serviceable item is overdue for maintenance.

17. The method of claim 13, further comprising:
generating a report characterizing maintenance of the serviceable item based on the associated time reference.

18. The method of claim 17, further comprising:
uploading the data structure to a remote computer for storage and analysis.

19. A system comprising:
a plurality of unique identification labels each representing a unique identifier (ID), each of a plurality of serviceable items having one of the plurality of unique identification labels affixed thereto, wherein a first group of the plurality of serviceable items are located at a first environment and a second group of the plurality of serviceable items are located at a second environment;
a handheld computing device that reads each of the plurality of unique identification labels to obtain each of the unique ID's from the plurality of serviceable items and associates each unique ID with a time reference indicating at least a calendar date that each unique ID was read;
a local computer that receives the unique ID's from the handheld computing device and generates a report characterizing maintenance of the plurality of serviceable items based on the associated time references, wherein the report includes comparisons between maintenance practices at the first environment and the second environment.

20. The system of claim 19, further comprising:
a remote computer that receives the unique ID's and the associated time references from the local computer and generates a report characterizing maintenance of the plurality of serviceable items based on the associated time references.

21. The system of claim 19, wherein the local computer further determines a target time reference representing a maximum service interval for the each of the plurality of serviceable items, analyzes the time references associated with each of the unique ID's against the target time reference and, based on the analysis, automatically generates a notification to a filed service person that one or more of the serviceable items are overdue for maintenance.

* * * * *

UNITED STATES PATENT AND TRADEMARK OFFICE
CERTIFICATE OF CORRECTION

| | |
|---|---|
| PATENT NO. | : 7,360,701 B2 |
| APPLICATION NO. | : 11/089919 |
| DATED | : April 22, 2008 |
| INVENTOR(S) | : Sagnak et al. |

It is certified that error appears in the above-identified patent and that said Letters Patent is hereby corrected as shown below:

Column 13, line 59, (Claim 4) "The method of as claim 3," should read -- The method of claim 3 --

Column 14, line 15, (Claim 10) "The method of as defined in claim 1" should read -- The method of claim 1 --

Column 14, line 50, (Claim 13) "maintenance For the" should read -- maintenance for the --

Column 14, line 57, (Claim 15) "unique identifier farther comprise" should read -- unique identifier further comprise --

Column 16, line 20, (Claim 21) "to a filed service" should read -- to a field service --

Signed and Sealed this
Fifth Day of April, 2011

David J. Kappos
*Director of the United States Patent and Trademark Office*